US009241130B2

(12) United States Patent
Ayers

(10) Patent No.: US 9,241,130 B2
(45) Date of Patent: Jan. 19, 2016

(54) STREAMING OF TELEPRESENCE VIDEO CONTENT

(75) Inventor: John W. Ayers, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 634 days.

(21) Appl. No.: 13/332,960

(22) Filed: Dec. 21, 2011

(65) Prior Publication Data

US 2012/0242778 A1 Sep. 27, 2012

Related U.S. Application Data

(60) Provisional application No. 61/454,649, filed on Mar. 21, 2011.

(51) Int. Cl.
*H04N 7/14* (2006.01)
*H04N 7/15* (2006.01)
*H04L 29/06* (2006.01)
*H04L 12/18* (2006.01)

(52) U.S. Cl.
CPC .............. *H04N 7/15* (2013.01); *H04L 12/1813* (2013.01); *H04L 63/029* (2013.01); *H04L 65/4038* (2013.01); *H04L 63/10* (2013.01)

(58) Field of Classification Search
CPC ...... H04N 7/14–7/157; H04N 7/173–7/17363; H04M 1/253; H04M 3/38–3/40; H04M 7/0024–7/006; H04M 2203/50–2203/509; H04M 3/56–3/569; H04L 12/16; H04L 12/1813; H04L 63/029; H04L 63/10; H04L 65/4038

USPC .................... 348/14.01–14.16; 370/259–271, 370/351–357; 709/201–207, 217–248; 379/67.1–88.28, 201.01, 379/202.01–207.01, 265.01–266.1
See application file for complete search history.

(56) References Cited

U.S. PATENT DOCUMENTS

| | | | | |
|---|---|---|---|---|
| 6,944,136 B2 * | 9/2005 | Kim et al. | ..................... | 370/260 |
| 7,454,460 B2 * | 11/2008 | Ivashin | .......................... | 709/203 |
| 7,483,945 B2 * | 1/2009 | Blumofe | ........................ | 709/204 |
| 7,701,882 B2 * | 4/2010 | Jones et al. | ................... | 370/260 |
| 2001/0043571 A1 * | 11/2001 | Jang et al. | ..................... | 370/260 |
| 2005/0207433 A1 * | 9/2005 | Ni | ................................. | 370/401 |
| 2007/0094698 A1 * | 4/2007 | Bountour et al. | ............. | 725/132 |
| 2008/0005245 A1 * | 1/2008 | Deboy et al. | .................. | 709/204 |
| 2008/0098101 A1 * | 4/2008 | Black et al. | ................... | 709/223 |
| 2009/0091656 A1 * | 4/2009 | Kitaru et al. | .................. | 348/554 |
| 2011/0149011 A1 * | 6/2011 | Kim et al. | .................. | 348/14.03 |
| 2012/0169830 A1 * | 7/2012 | Manjrekar | ................. | 348/14.08 |
| 2013/0027508 A1 * | 1/2013 | Charish et al. | ............. | 348/14.08 |

* cited by examiner

*Primary Examiner* — Hemant Patel
(74) *Attorney, Agent, or Firm* — Swanson & Bratschun, L.L.C.

(57) ABSTRACT

Solutions for distributing telepresence content to users and devices that are not direct participants in the telepresence session in which the content is created. For example, in some cases, a collector device might receive telepresence content from a dedicated telepresence endpoint and/or transmit that content, through a firewall, to a system that is outside the firewall and therefore is accessible from the Internet. In an aspect, such embodiments might employ a protocol that does not require any incoming connection from the outside system and therefore does not require any modification of the firewall policies in order to provide such content.

19 Claims, 5 Drawing Sheets

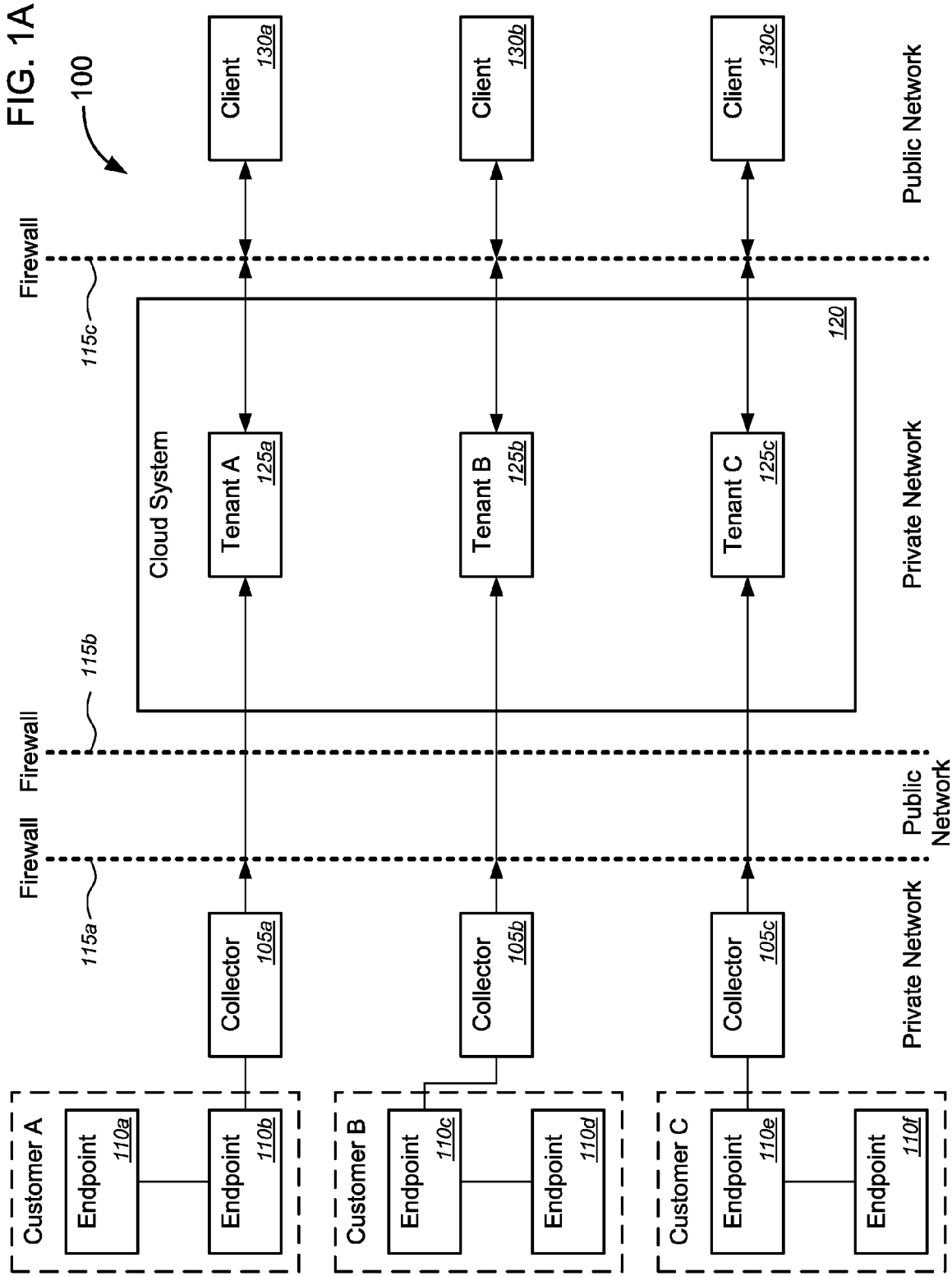

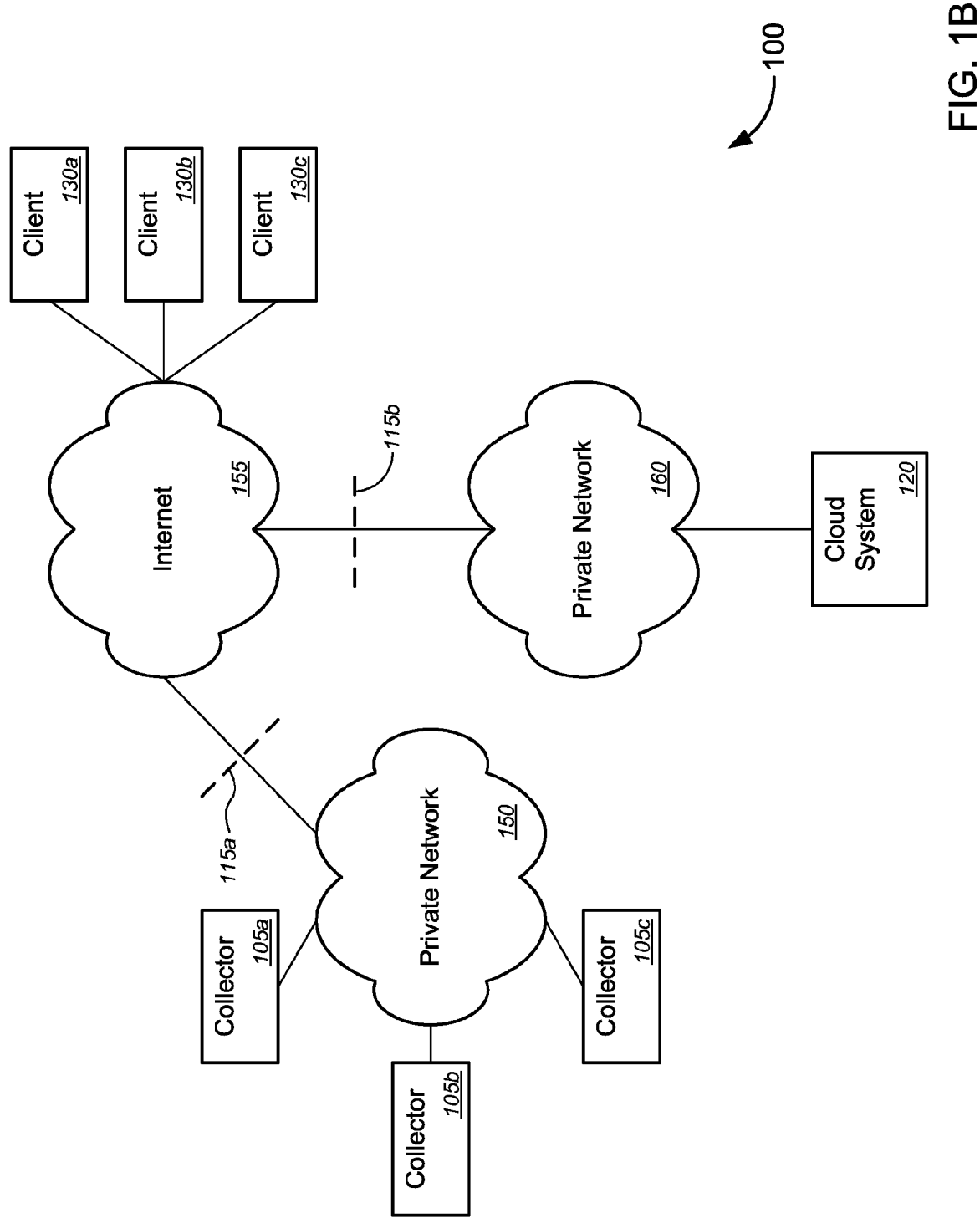

STREAMING OF TELEPRESENCE VIDEO CONTENT

CROSS-REFERENCE TO RELATED APPLICATIONS

This application claims the benefit, under 35 U.S.C. §119 (e), of provisional U.S. Patent Application No. 61/454,649, filed Mar. 21, 2011 by Ayers and titled, "Streaming of Telepresence Video Content," the entire disclosure of which is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to video distribution, and more particularly, to tools and techniques for providing a video feed of a telepresence session to non-participants in the session.

BACKGROUND

A telepresence session is a specific type of teleconference, in which dedicated hardware is used to provide a high-quality video and audio conference between two or more participants. Typically, a telepresence session will involve a dedicated video endpoint, such as the CISCO TELEPRESENCE SYSTEM 500™ or the CISCO TELEPRESENCE SYSTEM 3000™, commercially available from Cisco Systems, Inc., at the location of each participant. These endpoints will communicate across a private network to provide a highly collaborative videoconferencing environment.

In many cases, a telepresence session might include communications that would be of interest to parties other than those directly participating in the session. Examples include earnings conference calls, sales presentations, and the like. Because of the specialized hardware requirements of a telepresence system, however, it is difficult, if not impossible for a party to participate in (or even watch) a telepresence session if that party does not have that hardware present at his or her location. Moreover, most telepresence sessions are conducted on private networks that are isolated from the Internet (and many possible interested viewers) by a firewall. Security policies at many organizations prohibit any type of incoming connection (such as an HTTP request) from a user outside the firewall that would like to view the telepresence system.

Accordingly, there is a need for tools and techniques that can provide content from telepresence sessions to users outside of the private network on which the telepresence session is conducted.

BRIEF SUMMARY

Various embodiments provide solutions for distributing telepresence content to users and devices that are not direct participants in the telepresence session in which the content is created. In one set of embodiments, for example, a collector device receives telepresence content from a telepresence endpoint and transmits that content, through a firewall, to a system that is outside the firewall and therefore is accessible from the Internet. In an aspect, such embodiments might employ a protocol that does not require any incoming connection from the outside system and therefore does not require any modification of the firewall policies in order to provide such content.

In another aspect of some embodiments, the outside system is a cloud computing system that is capable of providing content distribution services. In a particular set of embodiments, for example, the cloud computing system might have established therein a plurality of tenants, each of which might be associated with a different telepresence content provider. (A "tenant," as described herein, can also be considered a "domain" for that tenant; however, this terminology has the potential to create confusion with the concept of a domain as that term is used in conjunction with the Domain Name System on the Internet, so the term "tenant" is used herein for purposes of semantic distinction. No substantive distinction is intended, however, between the term "domain," as used in provisional U.S. Patent Application No. 61/454,649, already incorporated by reference herein, and the term "tenant," as used herein). In some cases, each tenant might have its own authentication and/or authorization criteria, such that a single telepresence distribution system can be used to distribute telepresence sessions from a variety of telepresence content providers, each with its own tenant and/or authentication/authorization criteria.

Thus, in accordance with some embodiments, the cloud system can be used to host, for public access, telepresence content from one or more telepresence sessions (which may be generated by one or more entities). This access may be controlled (e.g., using authentication/authorization criteria) for some telepresence content, while other telepresence content can be made available to the public in general. In either case, however, a consumer of the telepresence content need not traverse the content provider's firewall but can instead obtain the content from the cloud computing system, which is situated outside the firewall. While the telepresence content distribution system can be used to provide live streaming of telepresence sessions, the system, in some cases, can also store and/or archive the telepresence content at the cloud computing system, so that it can be provided (e.g., on request) at a later time.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides methods of providing access to content from telepresence sessions. An exemplary method, in accordance with some embodiments, can provide access to content from a private telepresence session comprising a private teleconference between two or more parties. In an aspect, each of the two or more parties might be participating in the telepresence session via a dedicated telepresence video endpoint, each telepresence endpoint being situated on a private network isolated from the Internet by a firewall.

The method, in some embodiments, comprises accessing, via a HDMI connection, a telepresence endpoint with a computer system. In some cases, the telepresence endpoint and the computer system are situated behind a firewall that restricts inbound traffic. The method might further comprise receiving, at the computer system, a first set of telepresence content, comprising audio and video content from the telepresence system, via the HDMI connection with the telepresence endpoint. In an aspect, the first set of telepresence content might represent the private teleconference between the two or more parties and/or might meet a specified quality of service requirement.

The method can further comprise transmitting, using an HTTPS connection that does not require any inbound traffic through the firewall, the telepresence content from the computer system, through the firewall, to a cloud computing system that is outside the firewall and accessible from the Internet. In some cases, the method comprises establishing, in the cloud computing system, a plurality of tenants, including a first tenant for hosting telepresence content distributed by a first entity associated with at least one of the two or more parties and a second tenant for hosting telepresence content distributed by a second entity that is unaffiliated with the first entity. In some cases, each of the plurality of tenants can have specific authentication and authorization criteria separate from each other of the plurality of tenants.

The method, then, can comprise hosting, at first tenant in the cloud computing system, the first set of telepresence content. The method might also comprise receiving, at the first tenant and via the Internet, a plurality of incoming requests from a plurality of user devices, including a first user device operated by a first user, to access the first set of telepresence content. In some cases, each of the users of the user devices (and/or the devices themselves) can be authenticated and/or authorized against the specific authentication criteria of the first tenant. The method might further comprise streaming the first set of telepresence content from the cloud computing system to the plurality of user devices, including the first user device, over the Internet, based on the authentication and authorization of each of the plurality of users.

Another method, in accordance with other embodiments, provides access to content from a telepresence session comprising a private teleconference between two or more parties, each of which participates in the telepresence session via a dedicated telepresence endpoint, which might be isolated from the Internet by a firewall. The method, in some embodiments, comprises receiving, at a computer system, telepresence content from a telepresence endpoint of the telepresence session. The telepresence content might comprise, merely by way of example, audio and/or video representing the private teleconference between two or more parties. The method might also comprise transmitting, with the computer system, the telepresence content through a firewall to a cloud computing system accessible from the Internet, such that the telepresence content can be provided from the cloud computing system to a plurality of user devices on the Internet, without passing through the firewall.

In some cases, the firewall restricts inbound traffic, and the computer system and the telepresence endpoint are situated behind the firewall. The cloud computing system might be situated outside the firewall, and/or transmitting the telepresence content through the firewall might comprise transmitting the telepresence content using a technique that does not require inbound traffic from the cloud computing system to the computer system. In an aspect, transmitting the telepresence content through the firewall might comprise transmitting the telepresence content using an HTTPS connection.

Another set of embodiments provides systems. One example is a system for providing access to content from a telepresence session comprising a private teleconference between two or more parties. In an aspect, each of the two or more parties might participate in the telepresence session via a dedicated telepresence endpoint, which is isolated from the Internet by a firewall. The system, in one embodiment, comprises a computer system, which can include one or more processors and a computer readable medium in communication with the one or more processors. In an aspect, the computer readable medium might have encoded thereon a set of instructions executable by the computer system to perform one or more operations, including without limitation operations in accordance with various methods provided by different embodiments (such as the methods described above, to name a few examples).

Merely by way of example, in one embodiment, the set of instructions comprises instructions for receiving, at the computer system, telepresence content from a telepresence endpoint of a telepresence session. The set of instructions might also include instructions for transmitting the telepresence content through a firewall to a cloud computing system accessible from the Internet, such that the telepresence content can be provided from the cloud computing system to a plurality of user devices on the Internet, without passing through the firewall.

In some cases, the computer system will further comprise an HDMI port, and the instructions for receiving the telepresence content might comprise receiving the telepresence content via the HDMI port. In other cases, the system might include the cloud computing system, comprising a storage cloud a second set of instructions executable by the cloud computing system. This second set of instructions might comprise, for example, instructions for hosting the telepresence content in the storage cloud, and/or instructions for providing the telepresence content to a plurality of user devices on the Internet A further set of embodiments provides apparatus. An exemplary apparatus might comprise a computer readable medium having encoded thereon a set of instructions executable by one or more computers to perform one or more operations, including without limitation operations in accordance with various methods provided by different embodiments (such as the methods described above, to name a few examples).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 1A and 1B are block diagrams illustrating a system for distributing telepresence content, in accordance with various embodiments.

DETAILED DESCRIPTION OF CERTAIN EMBODIMENTS

Figure 2:
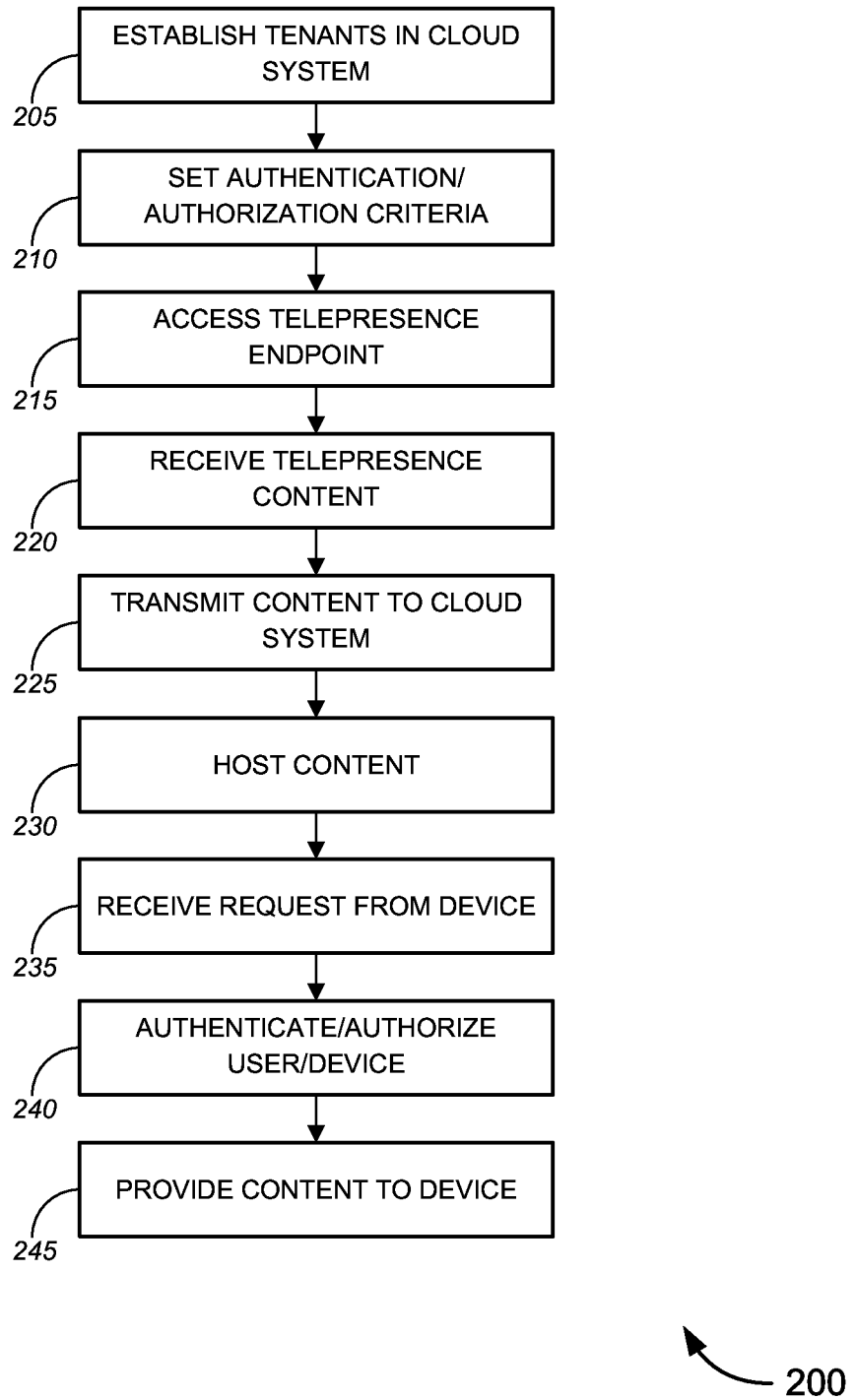
FIG. 2 is a process flow diagram illustrating a method of distributing telepresence content, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment, as other embodiments may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms of that term, such as "includes" and "included," should be considered non-exclusive. Terms such as "element" or "component" encompass both elements and components comprising one unit and elements and components that comprise more than one unit, unless specifically stated otherwise.

Various embodiments provide solutions for distributing telepresence content to users and devices that are not direct participants in the telepresence session in which the content is created. In one set of embodiments, for example, a collector device receives telepresence content from a telepresence endpoint and transmits that content, through a firewall, to a system that is outside the firewall and therefore is accessible from the Internet. In an aspect, such embodiments might employ a protocol that does not require any incoming connection from the outside system and therefore does not require any modification of the firewall policies in order to provide such content.

In another aspect of some embodiments, the outside system is a cloud computing system that is capable of providing content distribution services. In a particular set of embodiments, for example, the cloud computing system might have established therein a plurality of tenants, each of which might be associated with a different telepresence content provider. In some cases, each tenant might have its own authentication and/or authorization criteria, such that a single telepresence distribution system can be used to distribute telepresence sessions from a variety of telepresence content providers, each with its own tenant and/or authentication/authorization criteria.

Thus, in accordance with some embodiments, the cloud system can be used to host, for public access, telepresence content from one or more telepresence sessions (which may be generated by one or more entities). This access may be controlled (e.g., using authentication/authorization criteria) for some telepresence content, while other telepresence content can be made available to the public in general. In either case, however, a consumer of the telepresence content need not traverse the content provider's firewall but can instead obtain the content from the cloud computing system, which is situated outside the firewall. While the telepresence content distribution system can be used to provide live streaming of telepresence sessions, the system, in some cases, can also store and/or archive the telepresence content at the cloud computing system, so that it can be provided (e.g., on request) at a later time.

Through virtual computing, users can access archived video and view live-streamed telepresence video via the Internet. Using this virtual option, an end user can use more than one operating system and perform a multitude of functions at the same time through a single interface while receiving all the benefits without having to purchase or install dedicated software on his or her end device. Various embodiments can support a wide variety of standards. Merely by way of example, certain embodiments can support input files (or streams) that comply with the following standards and/or formats: 3GPPv6, MOV, MP4, VOB, M4V, WMV, MPEG, H264TS, FLV, and various other standard and/or proprietary video streaming and/or telepresence protocols. Other embodiments can provide video output (as files and/or streams) in a number for formats, including without limitation, 3GP, FLV, MP4, MPG, WAV, AVI and/or the like. Other embodiments might comply with a number of applicable standards (including but not limited to standards governing encoding, transport, and/or the like), such as Internet Engineering Task Force ("IETF") Request for Comment ("RFC") documents 3261, 2976, 3263, 3265, 3665, 3666, 2327, 3264 (SDP), 3550, 3551, 2833, 3158, 2396, 2806 (URI), 2045, 2046 (MIME), and 2190, among others.

FIG. 1A illustrates an example of a system 100 than can be used to provide access to telepresence content, in accordance with one set of embodiments. The system 100 comprises one or more content collector devices 105, each of which is configured to access one or more telepresence endpoints 110 to receive telepresence content, such as audio and/or video of a private telepresence session between two or more parties. In some embodiments, a collector device 105 can be a computer system that is configured to be in communication with a telepresence endpoint 110. Merely by way of example, in many cases, a telepresence endpoint 110 will be equipped with a high definition multimedia interface ("HDMI") port to allow audio and/or video output from the endpoint 110 to an external monitor. The collector device 105 might similarly be equipped with an HDMI port, such that an HDMI cable can be used to provide communication between the two devices, allowing the collector device 105 to receive telepresence content output from the telepresence endpoint 110. (In some cases, the collector device 105 might also have an HDMI output port and/or might be configured to output the telepresence content on that port, allowing the connector device 105 to pass-through the telepresence content. Thus, for example, in some embodiments, the collector device 105 can be installed inline between the endpoint 110 and an external monitor if desired.)

In some cases, a single collector device 105 can access multiple endpoints 110. In other cases, however, two endpoints 110 will be isolated from one another, both geographically and topographically (e.g., on separate private networks). Accordingly, in some embodiments, each collector device 105 receives telepresence content from a single telepresence endpoint 110. (It should be noted that, in many embodiments, a collector 105 need only be in communication with a single endpoint 110 to obtain all telepresence content from a telepresence session in which that endpoint 110 participates; thus, in such embodiments, there is no need to have a collector device 105 attached to more than one endpoint 110 participating in the telepresence session.)

To illustrate, FIG. 1A depicts three customers (each of which might have no association with the others and might be on separate private networks, each isolated from the Internet (and each other) by a firewall. A first party (Customer A) might have two telepresence endpoints 110a and 110b connected by a first private network; these two endpoints 110a and 110b engage in first a telepresence session (which might include one or more additional endpoints as well). A first collector device 105a is configured to access one of these endpoints 110b and receive telepresence content, e.g., in real time, as the telepresence session is conducted.

Likewise, a second, unrelated party (Customer B) has its own private network, on which two (or more) dedicated video telepresence endpoints 110c and 110d engage in a telepresence session. A second collector device 105a is in communication with one of those endpoints 110c, and it receives telepresence content from the session between those two endpoints 110c and 110d. Similarly, a third collector device 105c is in communication with a telepresence endpoint 110e operated by a third party (Customer C) that conducts a telepresence session with another telepresence endpoint 110f on another private network.

Different systems can feature any number of collector devices. Some systems might employ a single collector device 105, while other systems might employ hundreds of such devices 105. In any case, the telepresence content collected by the collector devices 105 is transmitted, through a firewall 115a, in some cases over a public network (e.g., the Internet) to a cloud computing system 120 (which, in some cases, might be on another private network isolated from the public network by. In a particular embodiment, each of the collector devices 105 resides within a private network (not shown on FIG. 1A) maintained by a telecommunications services provider that has a secured connection to each of the private networks on which the telepresence sessions are conducted. In other cases, each collector device 105 might reside within the same private network as the telepresence session it is collecting. Thus, while firewall 115a is illustrated on FIG. 1A as a single firewall, it should be appreciated that each entity (e.g., Customer A, Customer B, or Customer C) might have its own firewall through which the respective collector device (e.g., 105a, 105b, 105c, respectively) transmits the respective telepresence content.

In any case, many organizational policies restrict inbound traffic through the firewall 115a for security reasons. Therefore, transmission techniques that require an inbound request from a client to initiate the transmission are often infeasible. Accordingly, in some embodiments, the collector device is configured to transmit the telepresence content without requiring an initial inbound connection. In a particular embodiment, for example, each collector device 105 transmits received telepresence content using secure hypertext transfer protocol ("HTTPS") to the cloud computing system 120. The collector device 105 is configured to transmit the telepresence content without an initiating request from the cloud computing system 120, and the cloud computing system 120 is configured to receive and accept the telepresence content even though it was not sent in response to any request by the cloud computing system 120. Using this technique, the collector device 105 can transmit the telepresence content to the cloud computing system 120 without any inbound request from the cloud computing system 120, and without the need for any reconfiguration of the firewall to allow inbound traffic. Other transmission techniques are possible as well.

The cloud computing system 120 hosts the telepresence content received from the collector device. In other words, the telepresence content is stored on the cloud computing system 120 and can be made available, either in real time (or near-real time) or on an archived basis, in response to a request from a client device 130. Notably, in the illustrated embodiment, because the cloud computing system 120 resides outside the firewall 115a, it can accept inbound requests from a client 130 and can therefore provide the telepresence content using any of a number of standard or proprietary techniques, including without limitation, hypertext transfer protocol ("HTTP") communications, real time streaming protocol ("RTSP") communications, and/or the like. In some aspects, the cloud computing system 120 might reside on its own network, behind a firewall 115b. This firewall 115b, however, is not subject to the constraints that typically face corporate customers and therefore can be configured to allow the necessary connections to support embodiments described herein. (In other cases, the firewall 115b might be omitted, and/or the cloud computing system 120 might reside on the public network.)

In an aspect, the cloud computing system 120 can be any commercially-available (or proprietary) facility that is capable of receiving and hosting the telepresence content. Merely by way of example, systems such as Amazon S3™, InterNAP XIPCloud Storage™ and others provide cloud storage that can be employed as a cloud computing system 120 in accordance with various embodiments.

In one aspect, the cloud computing system might comprise a plurality of tenants (each of which might or might not be accessible by its own domain name, etc.) 125 for hosting telepresence content (and/or other content). In an aspect, each of the entities from which telepresence content is collected might have associated therewith one or more tenants. As illustrated, for example, Customer A might have an associated tenant 125a, Tenant A, while Customer B might have an associated tenant 125b, Tenant B, and Customer C might have an associated tenant 125c, Tenant C. The telepresence content collected by collector device 105a from Customer A thus might be hosted on Tenant A, while the telepresence content collected by collector device 105b from Customer B might be hosted on Tenant B, and the telepresence content collected by collector device 105c from Customer C might be hosted on Tenant C.

These separate tenants can provide multiple benefits. First, the private tenants for each customer can allow for individual branding, web pages, etc. for each entity that desires to make telepresence content available. Moreover, each tenant might be established with its own authentication and/or authorization systems, which employ different criteria. Thus, for example, Tenant A might have one user database (in which each registered user has a unique ID/password combination, for example) that is used to authenticate and/or authorize users to download telepresence content from Customer A, while Customer B has a different database, and Customer C has a different database still. In this way, each entity can ensure the security of its telepresence content, while the telecommunications provider can realize economies of scale by providing distribution services to multiple entities. (Of course, within this framework, any of the entities might elect to make some or all of its telepresence content available without authentication or authorization, which can be supported easily by the disclosed infrastructure.)

While FIG. 1A is arranged to show the path of data in accordance with various embodiment, FIG. 1B illustrates the same system 100 from a network perspective. The data collectors 105 are part of a private network 150 (which might be a plurality of private networks, as described above), which is isolated from the Internet 155 by a firewall 115a, described above. The cloud system 120 is part of another private network 160, which, in some embodiments, might also be isolated from the Internet 155 by a firewall 115b. The Internet 155 provides connectivity between the private network 150 of the collectors 105 and the private network 120 of the cloud system. The Internet 155 also provides connectivity between the cloud system's network 160 and the clients 130. Using the techniques described herein, the system 100 can use the cloud computing system 120 to provide access for the clients 130 to content collected by the collectors 105, which normally would not be accessible because of restrictions on the firewall 115a.

FIG. 2 illustrates a method 200 that can be used to provide access to telepresence content. While the techniques and procedures of the method 200 are depicted and/or described in a certain order for purposes of illustration, it should be appreciated that certain procedures may be reordered and/or omitted within the scope of various embodiments. Moreover, while the method illustrated by FIG. 2 can be implemented by (and, in some cases, are described below with respect to) the system 100 of FIG. 1A (or components thereof), this method may also be implemented using any suitable hardware implementation. Similarly, while the system 100 of FIG. 1A (and/or components thereof) can operate according to the method illustrated by FIG. 2 (e.g., by executing instructions embodied on a computer readable medium), the system 100 can also operate according to other modes of operation and/or perform other suitable procedures.

In some embodiments, the method 200 comprises establishing a plurality of tenants within a cloud computing system (block 205). Merely by way of example, in some cases, the storage provided by the cloud computing system (i.e., cloud storage) may be divided (either physically, or more typically, logically) into a plurality of discrete storage areas, using known techniques, and each of these discrete storage areas can be assigned to one or more entities for storing that entity's telepresence content (and/or other content). In some cases, each tenant will be associated with a different domain name, a different hostname, a different directory path, etc., although this is not required. (Thus, while the concept of a "tenant" within the cloud computing system might correlate to a conventional domain name within the Domain Name System, this need not necessarily be the case in every embodiment.) In an aspect, the telepresence content provided by a particular entity may be accessed by a user, as described below, by a request directed to the tenant established for that entity (e.g., as identified by a unique hostname, domain name, directory path, etc.) that identifies the entity while still ultimately addressing a location within the cloud storage.

At block 210, the method 200 comprises establishing authentication and/or authorization criteria for one or more of the tenants. Authentication criteria means any rules that govern who/what can be authenticated as an authorized user or device on the cloud computing system (or a specific tenant thereof), including lists of credentials (e.g., userids and corresponding passwords), while authorization criteria means any rules that govern what content an authenticated user/device is allowed to access within the cloud computing system (or a specific tenant thereof). As noted above, an entity might elect to secure its telepresence content (or other content) within the cloud computing system by requiring authentication and/or authorization of a user and/or device attempting to access that content. In some embodiments, each entity can have its own specific authentication/authorization criteria (which can include a list of authorized users/devices, authentication credentials for those users/devices, access control schema, and/or any other known authentication/authorization mechanisms) separate from each other entity whose telepresence content is hosted on the cloud computing system. Thus, within the cloud computing system, each tenant (or, in some cases, multiple tenants associated with a single entity) can have its own authentication/authorization system, which allows each entity control over which users/devices can access that entity's content, and which of that content can be accessed by each user/device.

The method 200 might further comprise, at block 215, accessing a telepresence endpoint. In an aspect of some embodiments, as noted above, a collector device will have an interface that is compatible with a similar interface on a dedicated telepresence endpoint. One example is an HDMI interface (port), which can be used to establish an HDMI connection (e.g., using an HDMI cable) between the HDMI interface on the collector device and the HDMI interface on the telepresence endpoint. Thus, for example, accessing the telepresence endpoint might comprise establishing communication between the collector device (e.g., a computer system) and the telepresence endpoint over the interface.

At block 220, the method 200 comprises receiving a set of telepresence content from the telepresence endpoint. In one aspect, the telepresence content (e.g., audio and/or video representing a telepresence session in which the telepresence endpoint participates) can be received at the collector device via the connection used to access the telepresence endpoint, e.g., via an HDMI connection between the collector device and the telepresence endpoint. In some cases, the collector device might encode, reformat, or otherwise process the telepresence content after receiving it. Alternatively and/or additionally, the collector device might store and/or cache the received telepresence content in a memory, either relatively temporarily or relatively permanently, before and/or after any necessary processing.

At block 225, the telepresence content can be transmitted to a cloud computing system. As noted above, in some embodiments, the collector device might transfer the content (either processed or unprocessed) through a firewall to a cloud computing system outside the firewall, using a technique that does not require reconfiguration of the firewall to allow inbound traffic from the cloud computing system. Alternatively and/or additionally, the collector device might use a transmission protocol such as HTTPS for the transmission, perhaps with modifications to allow outbound transmission without a prior inbound request.

Upon receiving the transmitted telepresence content, the cloud computing system hosts the telepresence content (block 230), e.g., by storing the telepresence content in cloud storage at the cloud computing system, and/or by making the telepresence content either in real time (or near-real time) or on an archived basis, in response to a request from a client device 130. As noted above, in some embodiments, the telepresence content is stored at a tenant, within the cloud storage at the cloud computing system, associated with the entity at which the telepresence content was generated. In some cases, the telepresence content can include metadata (provided by the collector device, for example) that identifies the tenant and/or the entity with which the telepresence content should be associated. In other cases, the cloud computing system might identify the correct tenant to host the telepresence content based on an identity of the collector device from which the content is received (e.g., if each collector device is associated with a particular telepresence endpoint and/or entity). Other techniques for identifying the correct tenant can be used as well.

Upon receiving a request, e.g., from a client device, for the telepresence content (block 235), the cloud computing system might authenticate the requesting user and/or device, and/or might authorize the requesting user/device to access the telepresence content (block 240). A request may be received using any of several techniques, such as URL referral, etc., and a request may be received via the Internet, private network, etc. Any of a variety of available authentication and/or authorization systems or schema can be used for this purpose. It should be noted, however, that each tenant might have its own authentication and/or authorization system and/or scheme, as described more fully above At block 245, the cloud computing system provides the telepresence content to the requesting device (e.g., client, user device, etc.), based, in some cases, on successful authentication and/or authorization of the requesting device (and/or of the user of the requesting device). A variety of techniques can be used to provide the content to the requesting device, and in some cases, the selected technique might depend on the device and/or the nature of the request received. Merely by way of example, if the requesting device is capable of receiving video via HTTP, and/or submits an HTTP request for the telepresence content, the cloud computing system might deliver the telepresence content via HTTP in response to the request. If the device is capable only of receiving video via RTSP, however, the cloud computing system might deliver the telepresence content using RTSP. Other technologies and/or wrappers, such as Adobe Flash, HTML5, etc., might be used as transport for the telepresence content.

In some cases, the cloud computing system might stream the content to the requesting device. In other cases, the cloud computing system might provide the telepresence content as a discrete file for download to the requesting device, which can then play the file using appropriate software on the device, store the file for later playback, etc. Moreover, as noted above, the telepresence content can be streamed (or otherwise provided to a requesting device) in real time or near-real time (assuming, in some cases, that the device/user has been authenticated and/or authorized beforehand), as, for example, in the case of live events. Alternatively and/or additionally, the telepresence content can be stored and/or archived so that it can be streamed (or otherwise provided) to a requesting device at a later time. It should be noted as well, that the operations described with blocks 235-245 can be repeated, simultaneously and/or serially, to provide telepresence content to a plurality of requesting devices.

Figure 3:
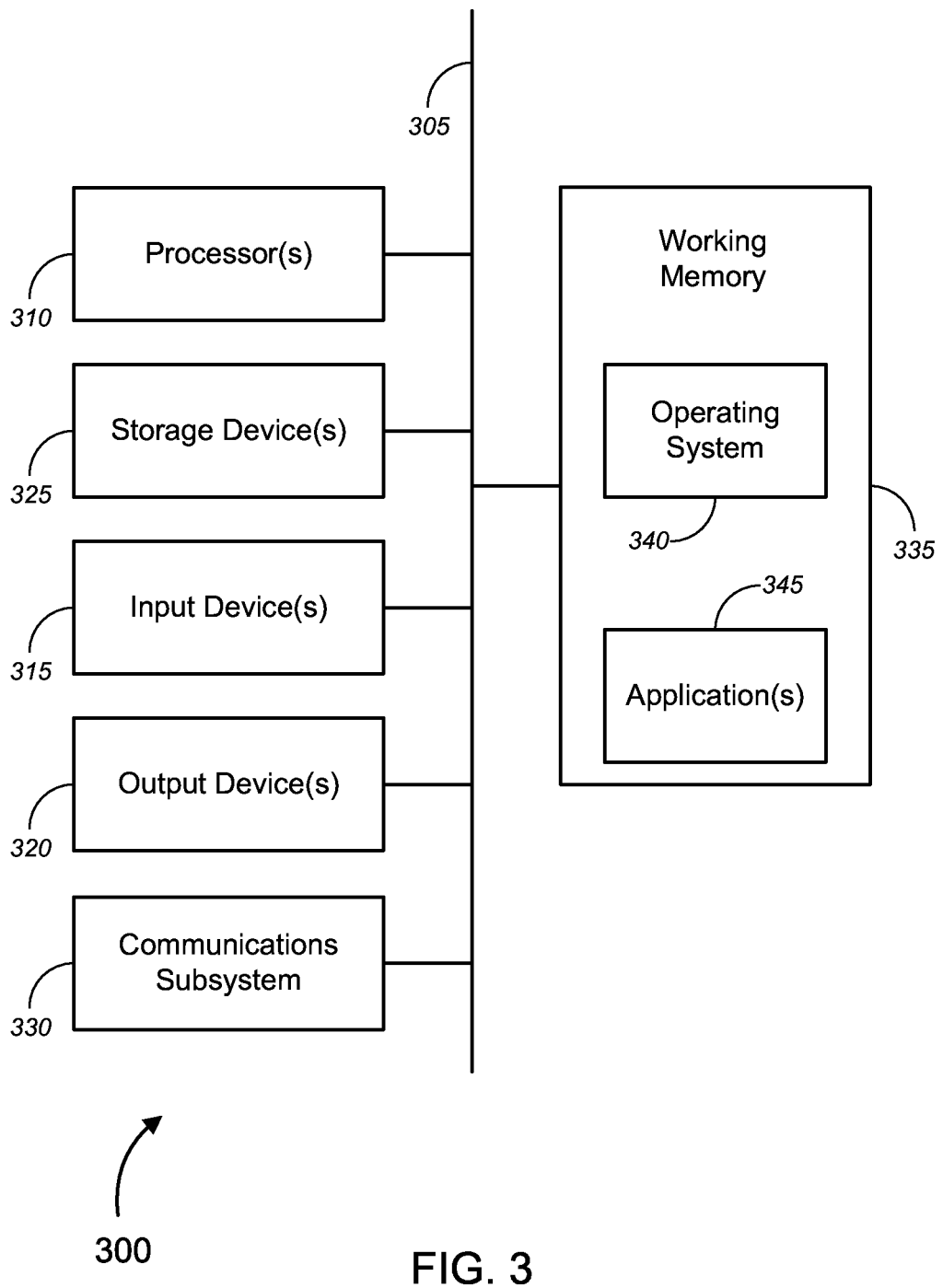
FIG. 3 is a generalized schematic diagram illustrating a computer system, in accordance with various embodiments.

FIG. 3 provides a schematic illustration of one embodiment of a computer system 300 that can perform the methods provided by various other embodiments, as described herein, and/or can function as a cloud computing system, collector device, user device (client), and/or the like. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
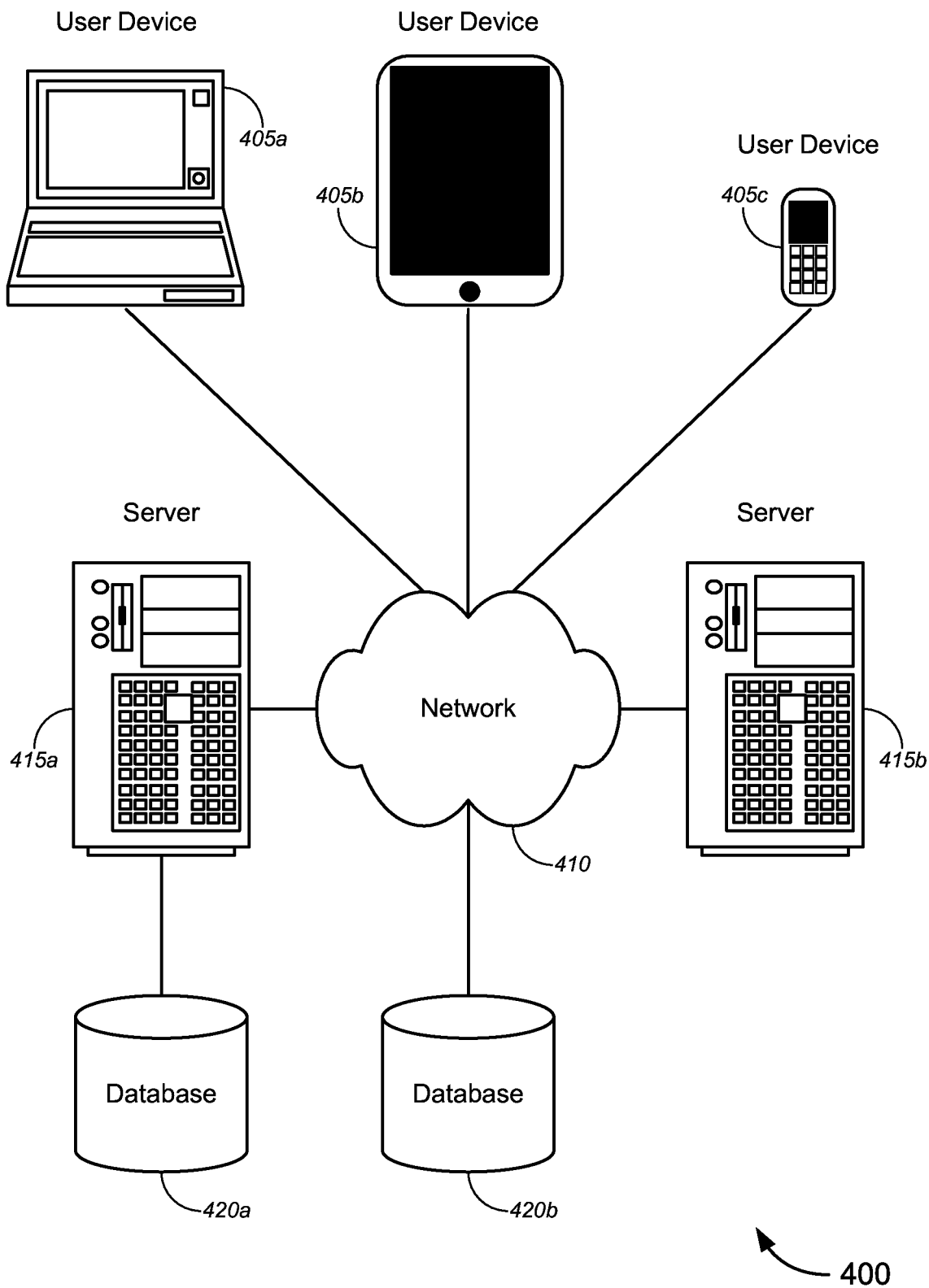
FIG. 4 is a block diagram illustrating a networked system of computers, which can be used in accordance with various embodiments.

As noted above, a set of embodiments comprises systems for providing telepresence content. FIG. 4 illustrates a schematic diagram of a system 400 that can be used in accordance with one set of embodiments. The system 400 can include one or more user devices 405, such as a personal computer 405a, a tablet computer 405b, a handheld computer/PDA/smartphone 405c, a feature phone (not illustrated on FIG. 4), and/or the like, which can function as clients that request (and receive) telepresence content from a cloud computer system. A user device 405 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user device 405 can also have any of a variety of applications, including one or more applications configured to perform methods provided by various embodiments (as described above, for example), as well as one or more office applications, database client and/or server applications, and/or web browser applications. Alternatively, a user device 405 can be any other electronic device, such as a thin-client computer, Internet-enabled mobile telephone, and/or personal digital assistant, capable of communicating via a network (e.g., the network 410 described below) and/or of displaying and navigating web pages, audio and/or video, or other types of electronic content, such as telepresence content. Although the exemplary system 400 is shown with three user devices 405, any number of user computers can be supported.

Certain embodiments operate in a networked environment, which can include a network 410. The network 410 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 410 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 415. In an aspect, one or more of the server computers 415 can be used as a cloud computing system, and/or can function to receive telepresence content from one or more collector devices (not shown on FIG. 4) e.g., as described above. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one or more application servers, which can be configured with one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBMT™ and the like, which can process requests from clients (including, depending on the configuration, dedicated database clients, API clients, web browsers, etc.) running on a user device 405 and/or another server 415. In some embodiments, an application server can create web pages dynamically for displaying the information in accordance with various embodiments, such as providing telepresence content to a requesting client. Data provided by an application server may be formatted as one or more web pages (comprising HTML, JavaScript, etc., for example) and/or may be forwarded to a user device 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement various disclosed methods, incorporated by an application running on a user computer 405 and/or another server 415. Alternatively, as those skilled in the art will appreciate, a file server can include all necessary files, allowing such an application to be invoked remotely by a user computer 405 and/or server 415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 435 can be a relational database, such as an Oracle database, that is adapted to store, update, and retrieve data in response to SQL-formatted commands. The database might be controlled and/or maintained by a database server, as described above, for example. The database 435 can be used to store data about tenants within a cloud computing system, authentication/authorization criteria, data about hosted telepresence content (and/or the telepresence content itself), and/or the like.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing access to content from a private telepresence session comprising a private teleconference between two or more parties, each of the two or more parties participating in the telepresence session via a dedicated telepresence video endpoint, each telepresence endpoint being situated on a private network isolated from the Internet by a firewall, the method comprising:

establishing the telepresence session between two or more telepresence endpoints, each of the two or more telepresence endpoints respectively associated with each of the two or more parties;

transmitting telepresence content directly between the two or more telepresence endpoints;

accessing, via a high-definition multimedia interface ("HDMI") connection, a first telepresence endpoint of the two or more telepresence endpoints with a collector device, the first telepresence endpoint and the collector device being situated behind a firewall that restricts inbound traffic;

retrieving, with the collector device, a first set of real-time telepresence content, comprising live audio and live video content transmitted from and received by the first telepresence endpoint, from the first telepresence endpoint, via the HDMI connection with the first telepresence endpoint, the first set of real-time telepresence content representing the private teleconference between the two or more parties as it is conducted in real-time and meeting a specified quality of service requirement;

transmitting, using a secure hypertext transfer protocol ("HTTPS") connection that does not require any inbound traffic through the firewall, the telepresence content from the collector device, through the firewall, to a cloud computing system that is outside the firewall and accessible from the Internet, in real-time;

establishing, in the cloud computing system, a plurality of tenants, the plurality of tenants comprising:
 a first tenant for hosting real-time telepresence content distributed in real-time by a first entity associated with at least one of the two or more parties; and
 a second tenant for hosting real-time telepresence content distributed by a second entity that is unaffiliated with the first entity;
 wherein each of the plurality of tenants has specific authentication and authorization criteria separate from each other of the plurality of tenants;

hosting, at the first tenant in the cloud computing system, the first set of real-time telepresence content;

receiving, at the first tenant and via the Internet, a plurality of incoming requests from a plurality of user devices, including a first user device operated by a first user, to access the first set of real-time telepresence content;

authenticating and authorizing each of the users of the plurality of user devices, including the first user, against the specific authentication criteria of the first tenant; and streaming the first set of real-time telepresence content from the cloud computing system to the plurality of user devices, including the first user device, over the Internet, based on the authentication and authorization of each of the plurality of users, each of the plurality of users being a non-participant to the private teleconference between the two or more parties.

2. A method of providing access to content from a telepresence session comprising a private teleconference between two or more parties, each of the two or more parties participating in the telepresence session via a dedicated telepresence endpoint, each telepresence endpoint being isolated from the Internet by a firewall, the method comprising:

establishing the telepresence session between two or more telepresence endpoints, each of the two or more telepresence endpoints respectively associated with each of the two or more parties;

transmitting telepresence content directly between the two or more telepresence endpoints;

accessing, with a computer system, a first telepresence endpoint of the two or more telepresence endpoints;

retrieving, with the computer system, real-time telepresence content transmitted from and received by the first telepresence endpoint, from the first telepresence endpoint, in real time, as the telepresence session is conducted; and transmitting, with the computer system, the real-time telepresence content through a firewall to a cloud computing system accessible from the Internet in real-time, without an initiating request from the cloud computing system, such that the telepresence content can be provided live, from the cloud computing system to a plurality of user devices on the Internet, without passing through the firewall, each of the plurality of user devices being associated with a non-participant to the private teleconference between the two or more parties.

3. The method of claim 2, wherein:
the firewall restricts inbound traffic;
the computer system and the first telepresence endpoint are situated behind the firewall; and
the cloud computing system is situated outside the firewall.

4. The method of claim 3, wherein transmitting the real-time telepresence content through the firewall comprises transmitting the real-time telepresence content using a technique that does not require inbound traffic from the cloud computing system to the computer system.

5. The method of claim 3, wherein transmitting the real-time telepresence content through the firewall comprises transmitting the telepresence content using a secure hypertext transfer protocol ("HTTPS") connection.

6. The method of claim 2, wherein the real-time telepresence content comprises live audio and live video representing the private teleconference between two or more parties.

7. The method of claim 6, wherein the real-time telepresence content meets a specified quality of service requirement.

8. The method of claim 6, wherein receiving the telepresence content comprises receiving the real-time telepresence content via a high definition multimedia interface ("HDMI") connection between the first telepresence endpoint and the computer system.

9. The method of claim 2, wherein the cloud computing system comprises a plurality of tenants, the plurality of tenants comprising:
a first tenant for hosting content distributed by a first entity associated with at least one of the two or more parties; and
a second tenant for hosting content distributed by a second entity that is unaffiliated with the first entity.

10. The method of claim 9, wherein each of the plurality of tenants has specific authentication and authorization criteria separate from each other of the plurality of tenants.

11. The method of claim 9, wherein the real-time telepresence content is hosted at the first tenant, such that it can be accessed by a request directed to the first tenant.

12. The method of claim 11, further comprising:
receiving, at the first tenant and via the Internet, a plurality of incoming requests from a plurality of user devices, including a first user device operated by a first user, to access the real-time telepresence content; and
streaming the real-time telepresence content from the cloud computing system to the plurality of user devices, including the first user device, over the Internet and in real-time.

13. The method of claim 12, further comprising:
authenticating and authorizing each of the users of the plurality of user devices, including the first user, against specific authentication criteria of the first tenant;
wherein streaming the telepresence content from the cloud computing system comprises streaming the real-time telepresence content based on the authentication and authorization of each of the plurality of users in real-time.

14. An apparatus, comprising:
a computer readable medium having encoded thereon a set of instructions executable by one or more computers to perform one or more operations, the set of instructions comprising:
instructions for establishing the telepresence session between two or more telepresence endpoints, each of the two or more telepresence endpoints respectively associated with each of two or more parties;
instructions for transmitting telepresence content directly between the two or more telepresence endpoints;
instructions for accessing a first telepresence endpoint of the two or more telepresence endpoints;
instructions for retrieving with a collector device real-time telepresence content transmitted from and received by the first telepresence endpoint, from the first telepresence endpoint, in real time as the telepresence session is conducted, the telepresence session comprising a live private teleconference between two or more parties; and
instructions for transmitting from the collector device, the real-time telepresence content through a firewall to a cloud computing system accessible from the Internet in real-time, without an initiating request from the cloud computing system, such that the telepresence content can be provided live from the cloud computing system to a plurality of user devices on the Internet, without passing through the firewall, each of the plurality of user devices being associated with a non-participant to the private teleconference between the two or more parties.

15. A system for providing access to content from a telepresence session comprising a private teleconference between two or more parties, each of the two or more parties participating in the telepresence session via a dedicated telepresence endpoint, each telepresence endpoint being isolated from the Internet by a firewall, the system comprising:
a computer system, comprising:
one or more processors; and
a computer readable medium in communication with the one or more processors, the computer readable medium having encoded thereon a set of instructions executable by the computer system to perform one or more operations, the set of instructions comprising:
instructions for establishing the telepresence session between two or more telepresence endpoints, each of the two or more telepresence endpoints respectively associated with each of two or more parties;
instructions for transmitting telepresence content directly between the two or more telepresence endpoints;
instructions for accessing a first telepresence endpoint of the two or more telepresence endpoints;
instructions for retrieving, at the computer system, real-time telepresence content transmitted from and received by the first telepresence endpoint, from the first telepresence endpoint of the telepresence session as it is conducted in real-time; and
instructions for transmitting from the computer system, the real-time telepresence content through a firewall to a cloud computing system accessible from the Internet in real-time, without an initiating request from the cloud computing system, such that the real-time telepresence content can be provided live from the cloud computing system to a plurality of user devices on the Internet, without passing through the firewall, each of the plurality of user devices being associated with a non-participant to the private teleconference between the two or more parties.

16. The system of claim 15, wherein the computer system further comprises a high definition multimedia interface ("HDMI") port, and wherein the instructions for receiving the real-time telepresence content comprise receiving the real-time telepresence content via the HDMI port.

17. The system of claim 15, further comprising the cloud computing system, the cloud computing system comprising:
a storage cloud; and
a second set of instructions executable by the cloud computing system, the second set of instructions comprising:
instructions for hosting the real-time telepresence content in the storage cloud; and
instructions for providing the real-time telepresence content to a plurality of user devices on the Internet.

18. The system of claim 17, wherein the second set of instructions further comprises:
instructions for establishing, in the cloud computing system, a plurality of tenants, the plurality of tenants comprising:
a first tenant for hosting content distributed by a first entity associated with at least one of the two or more parties; and
a second tenant for hosting content distributed by a second entity that is unaffiliated with the first entity;
wherein the instructions for hosting the real-time telepresence content comprise instructions for hosting the real-time telepresence content in the first tenant.

19. The system of claim 18, wherein the second set of instructions further comprises:
instructions for maintaining, for each of the plurality of tenants, specific authentication and authorization criteria separate from each other of the plurality of tenants; and
instructions for authenticating and authorizing each of the users of the plurality of user devices, including the first user, against the specific authentication criteria of the first tenant.

* * * * *